United States Patent [19]
Papuchon et al.

[11] Patent Number: 4,969,701
[45] Date of Patent: Nov. 13, 1990

[54] INTEGRATED ELECTRO-OPTICAL MODULATOR/COMMUTATOR WITH PASS-BAND RESPONSE

[75] Inventors: Michel Papuchon, Massy; Yannic Bourbin, Antony, both of France

[73] Assignee: Thomson-CSF, Paris, France

[21] Appl. No.: 219,367

[22] Filed: Jul. 15, 1988

[30] Foreign Application Priority Data

Jul. 17, 1987 [FR] France ............... 87 10124

[51] Int. Cl.$^5$ .......................... G02F 1/00
[52] U.S. Cl. ..................... 350/96.14; 350/355
[58] Field of Search ............ 350/96.14, 355, 356

[56] References Cited

U.S. PATENT DOCUMENTS

| | | | |
|---|---|---|---|
| 4,372,643 | 2/1983 | Liu et al. | 350/96.14 |
| 4,381,139 | 4/1983 | Alferness | 350/96.14 |
| 4,763,974 | 8/1988 | Thaniyavarn | 350/96.14 |
| 4,820,009 | 4/1989 | Thaniyavarn | 350/96.14 X |
| 4,842,367 | 6/1989 | Djupsjöbacka | 350/96.14 |
| 4,843,350 | 6/1989 | Nazarathy et al. | 350/96.14 X |

OTHER PUBLICATIONS

Integrated and Guided-Wave Optics, Technical Digest, Atlanta, Ga., Feb. 26-28, 1986, pp. 46-48; J. L. Jackel et al.
Journal of Lightwave Technology, vol. LT-3, No. 1, Feb. 1985, pp. 47-51, IEEE, New York, U.S.; L. Thylen et al.
Journal of Optical Communications, vol. 2, No. 1, Mar. 1981, pp. 2-6, Fachverlag Schiele & Schon, Berlin, DE; P. L. Liu.

Primary Examiner—John D. Lee
Attorney, Agent, or Firm—Oblon, Spivak, McClelland, Maier & Neustadt

[57] ABSTRACT

A modulator/commutator comprises two optical guide waves coupled to each other on a length and connected to an input guide by a Y junction. Electrodes are associated with each wave guide and enable the application of an interaction field on an interaction length. The optical and electrical waves have different propagation speeds. The interaction length and the coupling length are fixed so that their ratio has a value enabling an optical wave to successively experience the positive and negative alternations of an alternating field applied to the device by the electrodes, thus simulating a multiple-section operation. This device gives 100% efficiency of switching over to either of the two optical guides.

7 Claims, 7 Drawing Sheets

INTEGRATED ELECTRO-OPTICAL MODULATOR/COMMUTATOR WITH PASS-BAND RESPONSE

BACKGROUND OF THE INVENTION

1. Field of the Invention

The invention concerns an integrated electro-optical modulator/commutator with pass-band response.

When an electro-optical modulator is made, generally, at high frequencies, it can no longer be considered to be a component with localized constants but a component with distributed constants because its dimensions are in the order of the wavelength of the applied modulating electrical wave. This leads to making electrodes in the form of electrical transmission lines for which the characteristic impedance is chosen as a function of the use. Owing to the difference in frequencies between guided optical waves and modulation electrical waves, these two waves are propagated with different propagation constants (effective refraction indices) resulting in a limitation in the pass-band of the modulators.

Thus, for a phase modulator as shown in FIG. 1, comprising an optical guide G subjected to an alternating electrical field produced by two electrodes E1 and E2 framing the guide G and a current source S, it can be shown that the phase shift induced in a device such as the one shown in FIG. 1 is strictly null at the frequency:

$$f_o = \frac{c}{L(n_e - n_o)}$$

with

L, the interaction length,
c, the speed of light in a vacuum,
$n_e$, the effective electrical index,
$n_o$, the effective optical index.

The physical explanation of this phenomenon is that, at this frequency, a group of photons flowing through the modulator experience a positive alternation of the modulation field in the first half of the device and a negative modulation in the second half. For electro-optical modulators by Pockel's effect, the variation in index is a linear function of the field applied and, hence, the total phase shift is null. This phenomenon can be compared with the so-called "phase matching" problem in linear optics.

The pass-band of a device of this type is therefore directly related to the properties of the substrate at optical and electrical frequencies as well as to the interaction length.

In certain applications, it is worthwhile to use modulators for which the frequency response is not of the low-pass type (null frequency to maximum frequency) but rather of the band-pass type: $f_1 \leftrightarrow f_2$ around an operating frequency $f_o$ (the transmission of radar signals for example).

For the phase modulator described above, it is then possible to use the configuration of electrodes shown in FIG. 2. According to this configuration, there are provided two pairs of electrodes E3–E4 and E5–E6 supplied with AC power by a voltage source S. The connection of the electrodes is intersected so that the electrode E3 is connected to the electrode E6 and the electrode E4 is connected to the electrode E5. This configuration enables the reversal of the signal of the field applied in the two halves of the modulator. In this case, at null frequency, the accumulated phase shift is exactly null. On the contrary, at the frequency given by the preceding equation, the phase shift is at its maximum. It may be noted that, through the symmetry around the frequency $f_o$, the pass-band of the device of FIG. 2 is twice that of the device of FIG. 1 for the same total length of electrodes.

Naturally, this simple principle can be applied to multiple section electrodes to increase the operating frequency if the interaction length is fixed.

When an amplitude modulator is preferable, this principle can be applied to one or both branches of an interferometer, the basic drawing of which is shown in FIG. 3. This interferometer has two guides G1 and G2, one input guide E1 and one output guide S1.

In the examples given above, to work around the frequency $f_o$, it becomes necessary to split the control electrodes into several parts or at least to use configurations, the complicated nature of which makes them difficult to use at high frequencies.

The invention relates to a device enabling the use of a standard electrode, with the resonance around $f_o$ being obtained optically.

The basic principle of the device according to the invention is that it makes use of this difference between optical propagation and electrical propagation constants rather than trying to compensate for this difference by multiple-section electrodes.

SUMMARY OF THE INVENTION

The invention therefore concerns an integrated electro-optical modulator/commutator with band-pass response comprising:

a first integrated optical guide and a second integrated optical guide coupled to each other, with a determined coupling length;

a Y-shaped optical junction optically connecting the two guides to an input guide for, receiving an input wave through the input guide, and distributing this input wave symmetrically towards the first optical guide and the second optical guide;

at least one first electrode associated with the first optical guide and at least one second electrode associated with the second optical guide, these electrodes enabling the application, under the control of a voltage source, of at least one electrical field to said optical guides along a determined interaction length; wherein:

the propagation speeds of the optical and electrical waves in the two optical guides differ either because of different optical and electrical indices or because of different propagation directions of the optical guide and the electrical guide, or again, because of both factors at the same time;

the voltage source gives an AC voltage;

the ratio of the interaction length to the coupling length has a value such that for a given difference of propagation speeds of the optical and electrical guides, the optical wave in each guide successively experiences the positive and negative alternations of the electrical field given by the source and applied along the guides thus simulating, for a given modulation frequency, a multiple section electrodes operation with field reversal applied for the same device which will be used in null frequency.

BRIEF DESCRIPTION OF THE DRAWINGS

The various objects and features of the invention will emerge more clearly from the following description which is made by way of example with reference to the appended figures, of which.

DETAILED DESCRIPTION OF THE INVENTION

Figure 4:
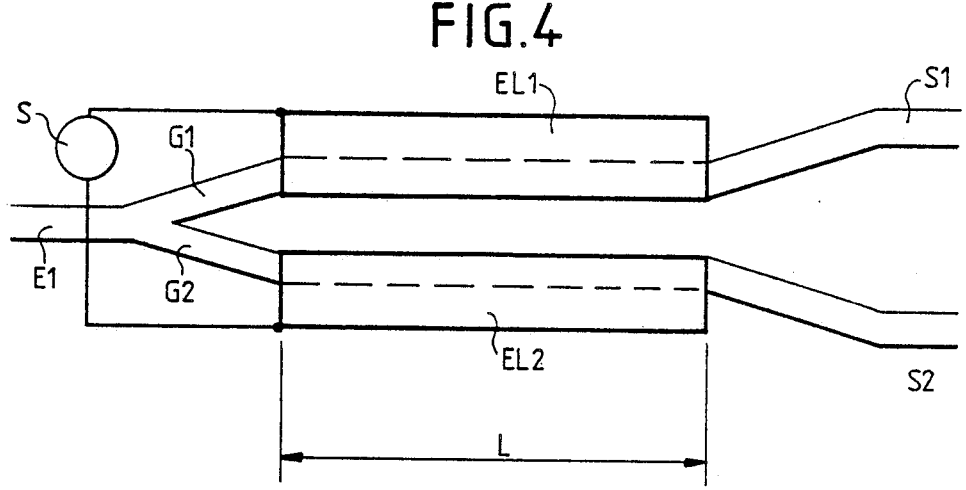
FIG. 4 shows an embodiment of the device according to the invention.

According to the invention shown in FIG. 4 a directional coupler is powered by a Y junction and has two coupled guides, G1 and G2, connected to an input guide E1 by means of a Y-shaped junction.

The junction Y is symmetrical and distributes the light energy received at the input guide E1 equally in the two guides G1 and G2. The two guides G1 and G2 thus receive two light waves of the same frequency, in phase and with the same energy.

The guides G1 and G2 are surmounted by electrodes EL1 and EL2 connected to a voltage source S.

Figure 5:
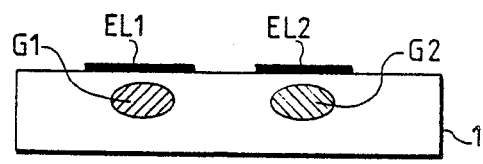
FIG. 5 shows a cross-section view of the guides G1 and G2 of FIG. 4.

As shown in FIG. 5, the guides G1 and G2 are made in a substrate 1 according to the techniques of integrated optics. The electrodes EL1 and EL2 are placed above the guides G1 and G2 respectively.

The electrodes EL1 and EL2 have a length L defining an interaction length.

Figure 6:
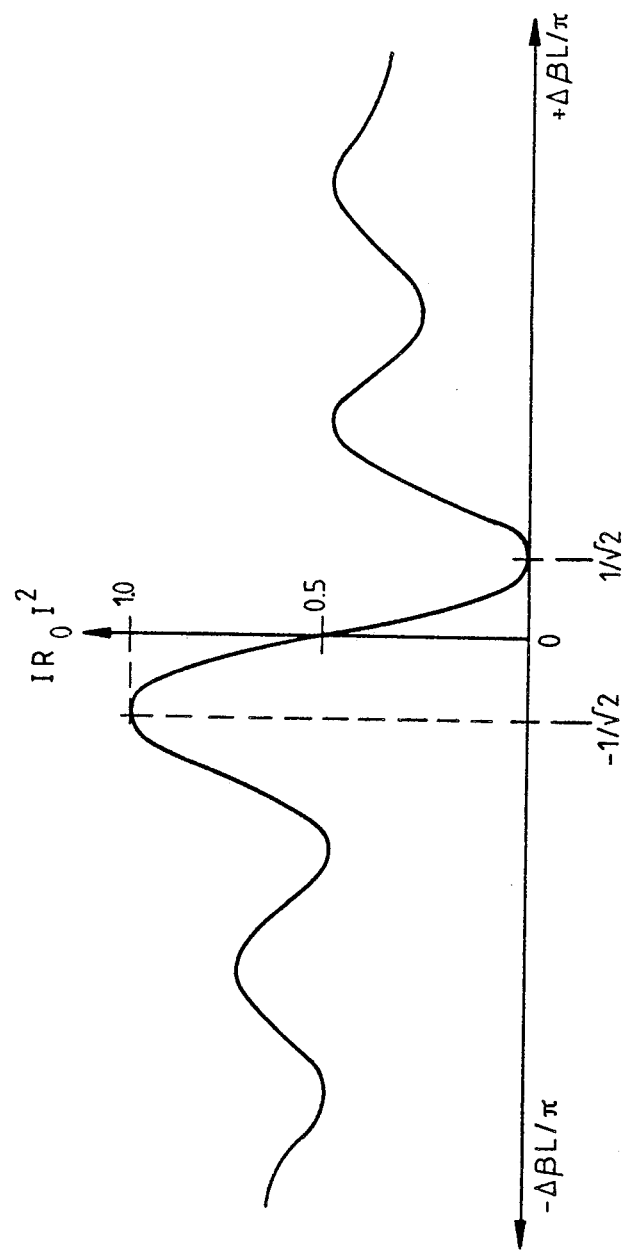
FIG. 6 shows a curve illustrating the working of the device of FIG. 4.

Furthermore, the guides G1 and G2 being coupled, in the case of FIG. 4 where a single-section electrode is used, if the coupling length $L_c$ and the interaction length L verify the relationship:

$$L/L_c = \frac{1}{\sqrt{2}}$$

and if $\Delta\beta$ is the variation of the optical propagation constant between the two guides, then a response curve of FIG. 6 is obtained when a $\Delta\beta$ is applied between the two guides. In this case, the device actually has a linear response around $\Delta\beta=0$.

A detailed analysis of the functioning of a device of this type shows that it can work with multiple-section electrodes.

Figure 1:
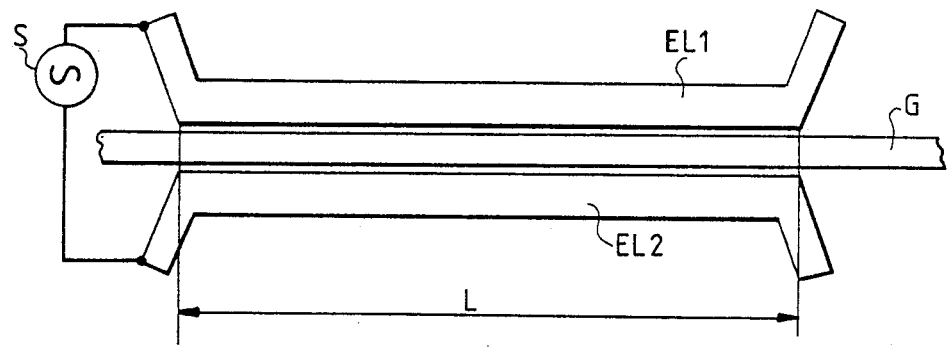
FIGS. 1 to 3 show prior art devices already described.
Figure 2:
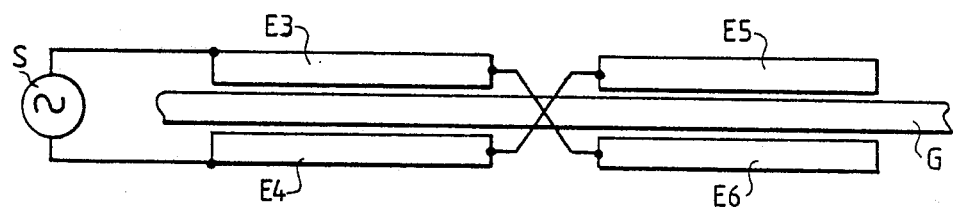
Figure 3:
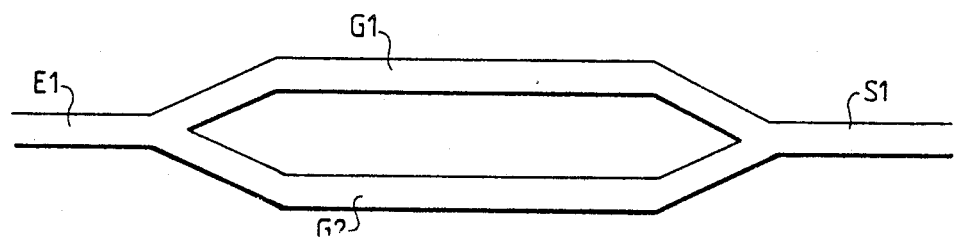
Figure 7:
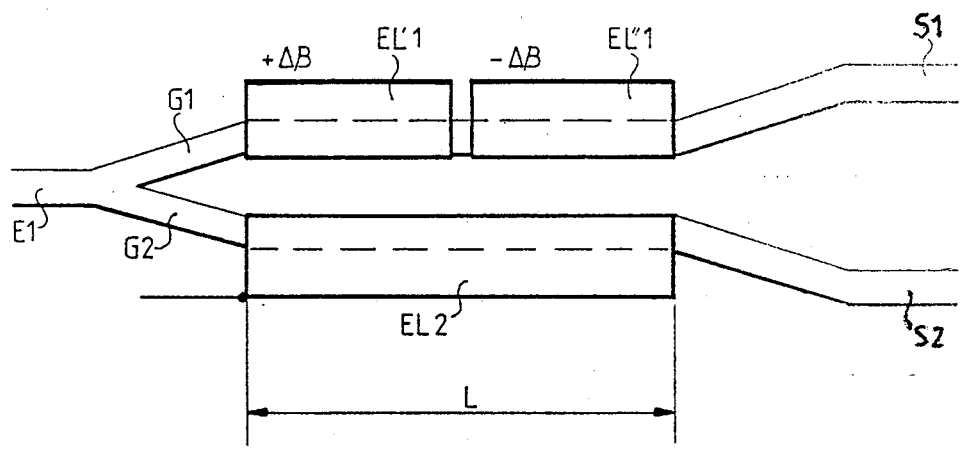
FIG. 7 shows an embodiment with two sections of the device of the invention.

FIG. 7 shows a device with two sections according to which the electrode of the guide G1 has been split into two identical electrodes EL'1 and EL"2. These electrodes are powered electrically so as to give electrical fields that are phase shifted by $\pi$ radians. It is also possible to obtain a similar result with electrodes connected as in FIG. 2.

Figure 8:
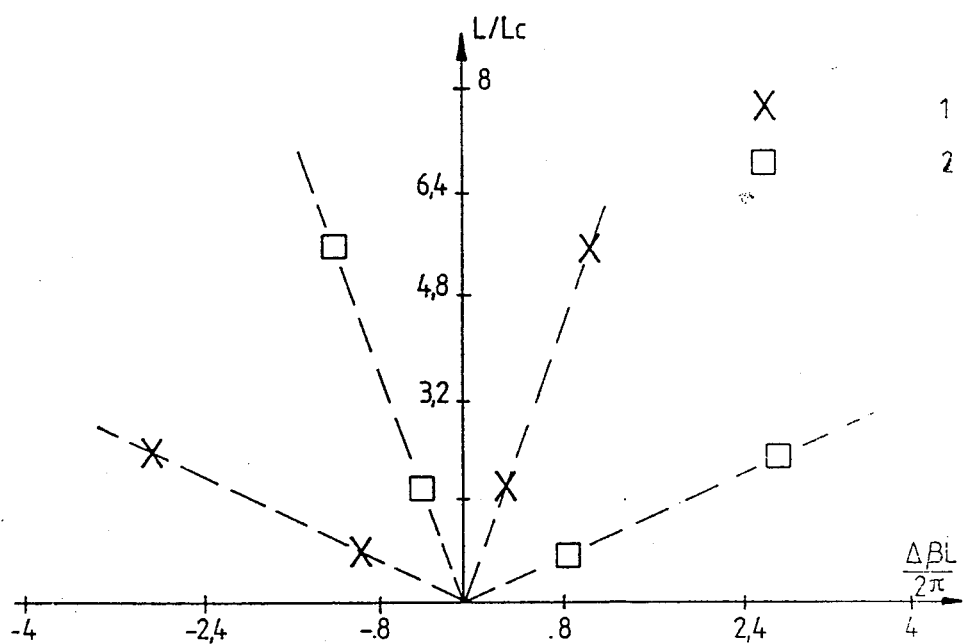
FIG. 8 shows a graph for switching over the two section device of FIG. 7.

FIG. 8 corresponds to the graph of the switch-over operation of the two-section device of FIG. 7. The $$\frac{\Delta\beta L}{2\pi}$$

created between the two guides is on the X-axis and the $L/L_c$ is on the Y-axis. The crosses correspond to the points where the energy has been transferred to the guide G1 and the squares correspond to the points where the energy has been transferred to the guide G2.

It is seen that certain values of $L/L_c$ give 100% modulation. These values of $L/L_c$ meet the relationship:

$$L/L_c = N \cos(\pi/4N).$$

Figure 9:
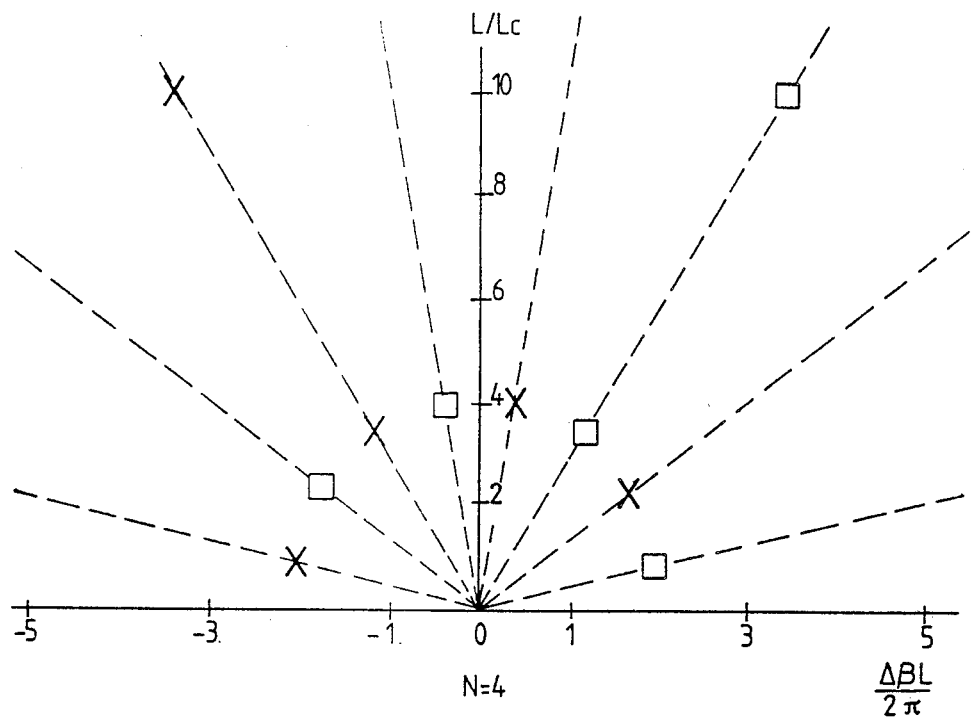
FIG. 9 shows a graph for switching over the device of the invention with four sections.
Figure 10:
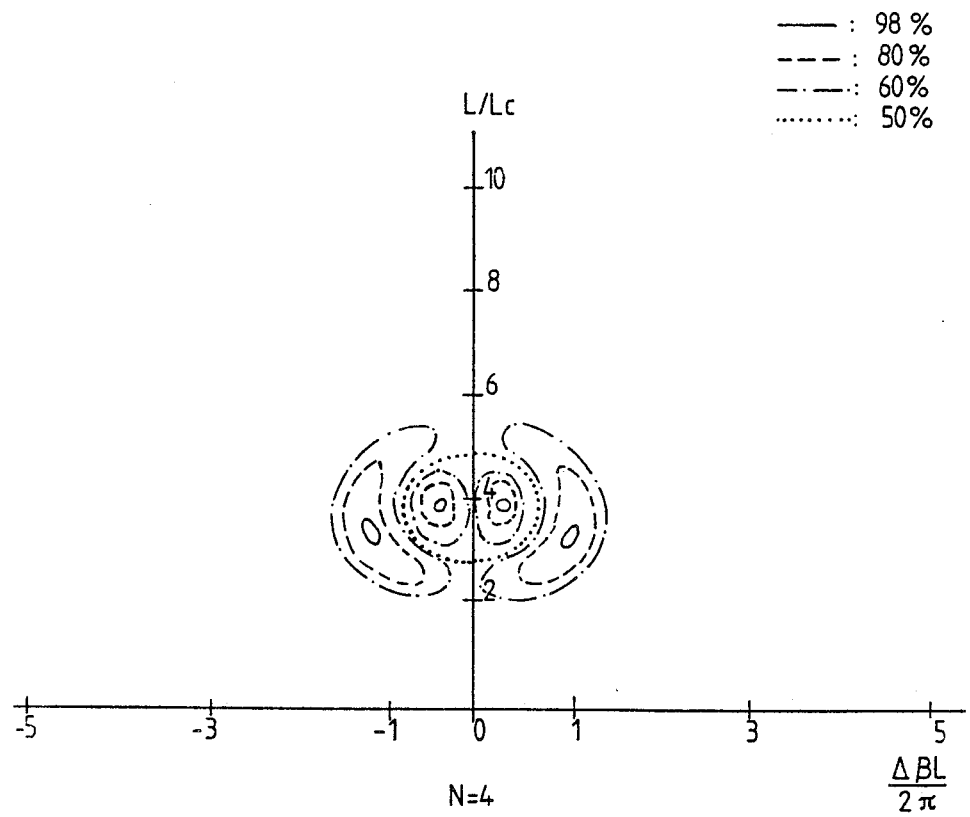
FIG. 10 shows a graph showing the locations of modulation of equal efficiencies for a device with four sections.

FIG. 9 gives an example of operation of a device with 4 sections and FIG. 10 (4 sections) shows the locations corresponding to 99%, 80% etc of modulation, thus making it possible to determine the precision with which the device should be made to obtain a given modulation rate.

With an operating principle of this type, it can be easily seen that, for a given interaction length and given effective optical and electrical indices, the device with a homogeneous (single-section) electrode will work at 1, 2, ... sections depending on the frequency of the modulation wave as described earlier.

The ratio $L/L_c$ of the interaction length L to the coupling length $L_c$ has a value such that for a difference $\Delta v$ (which is determined) between the propagation speeds of the optical wave and the electrical wave, the optical wave in each guide G1, G2 successively undergoes the positive and negative alternations of the electrical field given by the source S and applied along the guides G1, G2 thus simulating, for a determined modulation frequency, multiple-section electrode operation with field reversal, applied to the same device which would be used in null frequency.

According to the invention, an operation with N simulated sections is obtained by applying an electrical field with the frequency $f_{N+}$ meeting the relationship:

$$f_N = \frac{N}{2} \frac{c}{L(n_e - n_o)}$$

This relationship is valid for propagation of the electrical and optical waves in the same direction.

For propagation of these waves in opposite directions, the relationship giving $f_N$ is:

$$f_N = \frac{N}{2} \frac{c}{L(n_e + n_o)}$$

Finally, it must be specified that, in the case of a device with multiple-sections of electrodes (N pairs of electrodes) with a null frequency field, with the device then working in field reversal by intersected connections of electrodes (see, for example, FIG. 2), the invention provides for having:

$$\frac{L}{L_c} \simeq N \cos \frac{\pi}{4N}$$

Substantially 100% efficiency will then be obtained for switching over towards either of the two guides G1 or G2.

Figure 11:
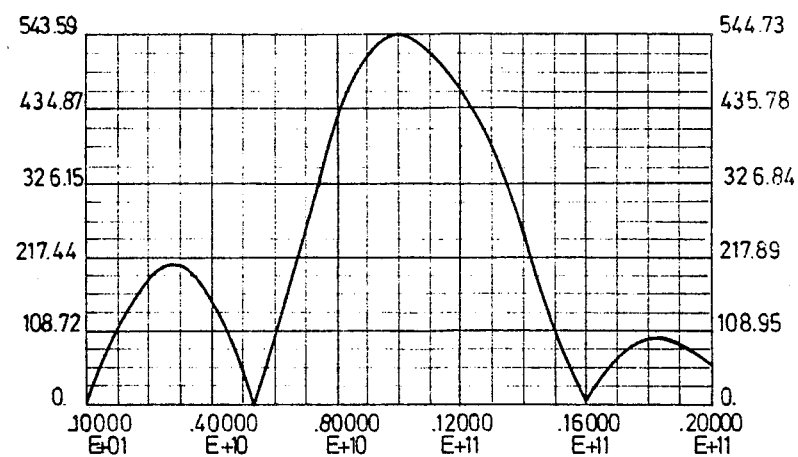
FIG. 11 shows a frequency response curve of the device of the invention.
Figure 12:
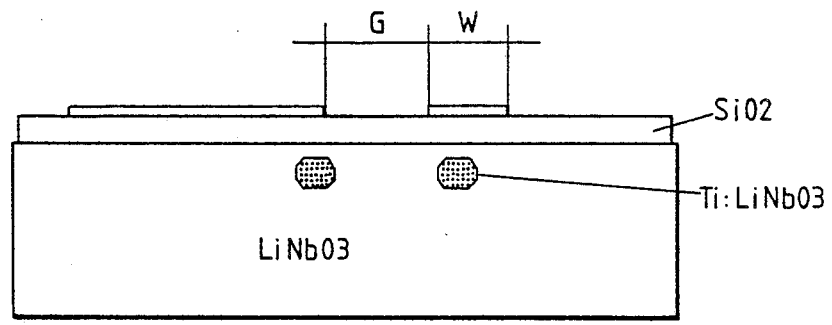
FIG. 12 shows a sectional view of an embodiment of the device of the invention.

An example of operation of this type is demonstrated in FIG. 11 which shows the frequency response characteristic of a modulator such as the modulator of FIG. 4 which has the following characteristics:

Material used: $LiNbO_3$ with:
effective optical index: 2.2
optical electrical index: 4.25
interaction length: 8.56 mm
$L/L_c = 3.92$
counter-propagated electrical and optical waves, adaptation of all the impedance values achieved.

In this case, the modulator has an electro-optical resonant behavior of the four-section type around the frequency of 10 GHz.

It must be noted that the working frequency is directly related to the choice of $L/L_c$ and that, in fact, the pass-band is related to the length of the electrode.

For example, the specification of the invention can be achieved as follows:

A substrate of $LiNbO_3$ can be used in which the wave guides are manufactured by titanium diffusion. At 1.3 μm, the width of the titanium band before diffusion may be 7 microns, and its thickness may be 450 angstroms to enable the obtaining of monomode guides (with diffusion at 950° C.) for 6 hours).

On the guides, a buffer layer of $SiO_2$ (thickness ~3000 angstroms) is deposited to insulate the guided mode of the metallic electrodes and thus reduce the propagation losses to the minimum. The depositing technique used may be:
vapor phase deposition
sputtering.

The electrodes are obtained by the masking of a thin layer of gold (obtained by evaporation or sputtering). The thickness is then increased to about 4 microns by electrolytic deposition to reduce electrode ohmic losses (FIG. 11). The geometry of the electrodes is chosen to ensure the electromagnetic transmission of the modulation wave. In the example of FIG. 11, the line is of the asymmetrical, coplanar type. To provide for a characteristic impedance of 50 X, the W/G ratio should be equal to 0.6 which, for a typical space G of 10 microns, gives a width W of about 6 microns.

It is quite clear that the above description has been given as a non-restrictive example. The forms of embodiment and the digital examples have been given only to illustrate the description. Other alternative embodiments can be considered without going beyond the scope of the invention.

What is claimed is:

1. An integrated electro-optical modulator/commutator device with band-pass response, comprising:
a first integrated optical guide and a second integrated optical guide coupled to each other with a predetermined coupling length;
an input guide;
a Y-shaped optical junction, optically connecting the first and second optical guides to said input guide, for receiving optical waves from the input guide and distributing the optical waves symmetrically toward the first optical guide and the second optical guide;
a voltage source for supplying electrical waves of AC voltage;
at least one first electrode, electrically connected to the first optical guide, for providing a first electrical guide, and at least one second electrode, electrically connected to said second optical guide, for providing a second electrical guide, said at least one first and second electrodes connecting to said voltage source and each having a predetermined interaction length;
the propagation speeds of the optical waves and the electrical waves in said first and second optical guides differ due to at least one of a difference between an optical and electrical index of refraction for said first optical guide and an optical and an electrical index of refraction for said second optical guide, and the first and second optical guides having a propagation direction different from a propagation direction of said first and second electrical guides; and
the ratio of the interaction length to the coupling length has a value such that, for a given difference of propagation speeds of the optical and electrical guides, the optical wave in each optical guide successively experiences the positive and negative alternations of the electrical field given by the voltage source and applied along the electrical guides thus simulating, for a given modulation frequency, a multiple-section electrodes operation with field reversal used for a null frequency.

2. A device according to claim 1, wherein:
the voltage source enables the application of an alternating electrical field, the frequency of which has a value proportionate to the number of simulated electrode sections and to the speed of light in a vacuum, and inversely proportional to twice the interaction length multiplied by the sum of the optical and electrical indices of refraction when the optical and electrical waves are propagated in opposite directions, or multiplied by the difference between these indices of refraction when the optical and electrical waves are propagated in the same direction.

3. A device according to claim 1, wherein:
on a determined interaction length, are formed for each optical guide, an equal number of electrodes, all of a same length, these electrodes of the two optical guides forming pairs of electrodes for the application of electrical fields to the optical guides, the electrical connections of the electrodes of two neighboring pairs being intersected;
the source gives a null frequency voltage; and
the ratio of the interaction length to the coupling length has a value proportionate to the number of electrode pairs and to the cosine of $\pi$ radians divided by four times the number of electrode pairs.

4. A device according to claim 1, further comprising:
a substrate made of an electro-optical material connected to said first and second optical guides.

5. A device according to claim 4 wherein the substrate is made of lithium niobate and the optical guides are made by titanium diffusion.

6. A device according to claim 1, further comprising a substrate on which the optical guides are formed covered with a buffer layer on which are formed the electrodes.

7. A device according to claim 6 wherein the buffer layer is a silicon oxide.

* * * * *